(12) United States Patent
McIntosh (10) Patent No.: US 8,511,365 B2
(45) Date of Patent: *Aug. 20, 2013

(54) INFLATABLE FILM PRODUCTION PANELS

(76) Inventor: David McIntosh, North Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/285,790

(22) Filed: Oct. 31, 2011

(65) Prior Publication Data

US 2012/0042577 A1    Feb. 23, 2012

Related U.S. Application Data

(63) Continuation-in-part of application No. 12/105,251, filed on Apr. 17, 2008, now Pat. No. 8,047,257.

(60) Provisional application No. 60/912,636, filed on Apr. 18, 2007.

(51) Int. Cl.
*A47G 5/00* (2006.01)
*A47H 1/19* (2006.01)
*E04F 13/00* (2006.01)

(52) U.S. Cl.
USPC ............... 160/368.1; 160/351; 52/506.06

(58) Field of Classification Search
USPC ............ 160/135, 351, 368.1; 52/2.11, 2.15, 52/2.19, 2.22, 506.01, 506.06; 441/40, 41
See application file for complete search history.

(56) References Cited

U.S. PATENT DOCUMENTS

| | | | |
|---|---|---|---|
| 4,099,351 | A | 7/1978 | Dalo et al. |
| 4,179,832 | A | 12/1979 | Lemelson |
| 4,369,591 | A | 1/1983 | Vicino |
| 4,452,017 | A | 6/1984 | Tang et al. |
| 4,478,012 | A | 10/1984 | Fraioli |
| 4,676,032 | A | 6/1987 | Jutras |
| 4,805,355 | A | 2/1989 | Plant |
| 5,311,706 | A | 5/1994 | Sallee |
| 5,343,658 | A | 9/1994 | McLorg |
| 5,570,544 | A | 11/1996 | Hale et al. |
| 5,813,172 | A | 9/1998 | McNally |
| 6,008,938 | A | 12/1999 | Suehle et al. |
| 6,144,550 | A | 11/2000 | Weber et al. |
| 6,219,009 | B1 | 4/2001 | Shipley et al. |
| 6,276,815 | B1 | 8/2001 | Wu |
| 6,647,668 | B1 | 11/2003 | Cohee et al. |
| 8,047,257 | B2 | 11/2011 | McIntosh |
| 2002/0100221 | A1 | 8/2002 | Williams |
| 2006/0073748 | A1 | 4/2006 | Boujon |
| 2006/0101743 | A1 | 5/2006 | Nickerson et al. |
| 2007/0000182 | A1 | 1/2007 | Boujon |

*Primary Examiner* — Michael Safavi
(74) *Attorney, Agent, or Firm* — Oyen Wiggs Green & Mutala LLP (57) ABSTRACT

An apparatus for suspending above a shooting location comprises an inflatable panel and a plurality of attachment points from which the panel may be suspended. An inflation apparatus directs air into the panel through an air inlet to inflate the panel.

21 Claims, 8 Drawing Sheets

INFLATABLE FILM PRODUCTION PANELS

REFERENCE TO RELATED APPLICATION

This application is a continuation-in-part of U.S. patent application Ser. No. 12/105,251 filed 17 Apr. 2008 and entitled "INFLATABLE FILM PRODUCTION ACCESSORIES," which in turn claims priority from U.S. Provisional Patent Application No. 60/912,636 filed 18 Apr. 2007 and entitled "INFLATABLE FILM PRODUCTION ACCESSORY," both of which are hereby incorporated by reference herein.

TECHNICAL FIELD

The invention relates to panels for use in the film and television industry. Certain embodiments may be applied to diffusing or reflecting light, providing blue, green or other background screens, or protecting a shooting location from the elements.

BACKGROUND

In the film and television industry, it is sometimes necessary or desirable to provide temporary structures for light diffusion, light reflection, and/or shelter from the elements when shooting outdoors. This often involves suspending an aluminum truss structure which supports an expanse of material (i.e. fabric or plastic) above a shooting location. Such truss structures are typically constructed on location, involving considerable time and expense. Such truss structures are also relatively heavy, requiring large and expensive cranes from which to suspend them.

The inventor has determined a need for temporary structures for light diffusion, light reflection, and/or shelter from the elements that may be set up quickly and inexpensively.

SUMMARY

The following embodiments and aspects thereof are described and illustrated in conjunction with systems, tools and methods which are meant to be exemplary and illustrative, not limiting in scope.

One aspect of the invention provides an apparatus for suspending over a shooting location comprising an inflatable panel having walls constructed from a flexible airtight material enclosing an interior of the panel. At least one air inlet is located in one of the walls of the panel, and an inflation apparatus is coupled to the air inlet and configured to direct air into the interior of the panel. A plurality of attachment points are provided for facilitating suspension of the apparatus, each attachment point coupled to at least one corresponding load bearing interior eyelet located in the interior of the panel. A plurality of upper interior eyelets are located in the interior of the panel on a lower side of an upper wall of the panel, and a plurality of lower interior eyelets are located in the interior of the panel on an upper side of a lower wall of the panel. At least one interior connector extends between the load bearing interior eyelets, the lower interior eyelets and the upper interior eyelets. A plurality of lower exterior eyelets are located on a lower side of the lower wall of the panel, each lower exterior eyelet coupled to a corresponding lower interior eyelet.

In addition to the exemplary aspects and embodiments described above, further aspects and embodiments will become apparent by reference to the drawings and by study of the following detailed descriptions.

BRIEF DESCRIPTION OF DRAWINGS

In drawings which illustrate non-limiting embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
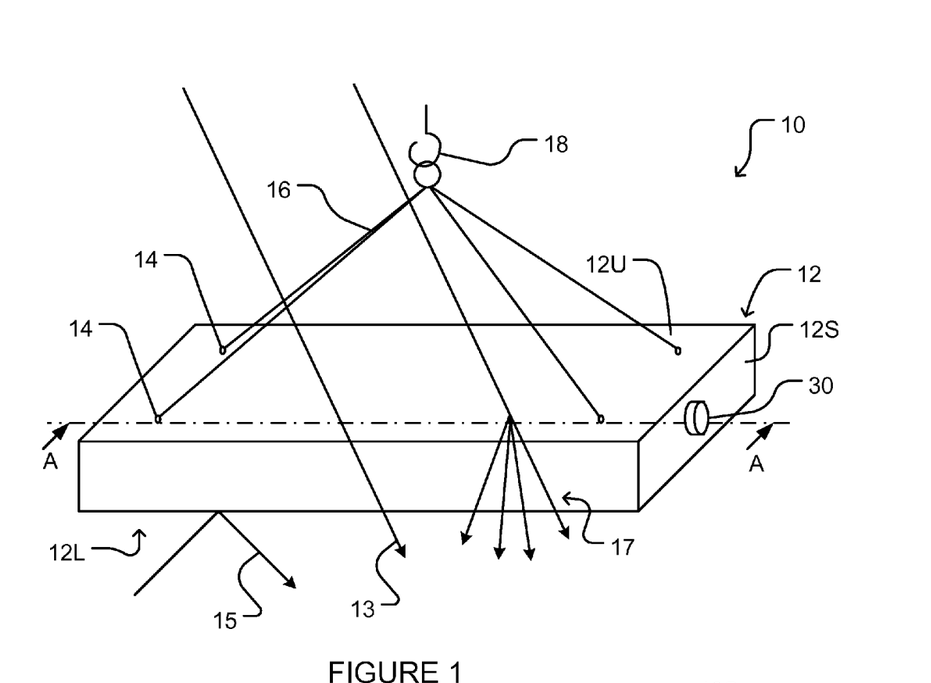
FIG. 1 shows a structure according to one embodiment.

FIG. 1 shows a structure 10 according to one embodiment of the invention. Structure 10 comprises an inflatable panel 12 having an upper wall 12U, a lower wall 12L and side walls 12S. In the illustrated embodiment, panel 12 has a generally rectangular shape, but other shapes are also possible. The walls of panel 12 may be constructed from flexible, airtight material, for example. Example materials include clear rubberized fabrics, mylar, synthetic sail cloths, Ethylene TetrafluoroEthylene (ETFE), or the like.

Structure 10 has a plurality of attachment points to facilitate suspension of structure 10. In the illustrated embodiment, the attachment points comprise upper exterior eyelets 14 on the outside of upper wall 12U. Upper exterior eyelets 14 may be engaged by lines 16 so that panel 12 may be suspended from a hook 18, such as for example the hook of a crane. Panel 12 may be suspended above a shooting location to provide light diffusion, light reflection, and/or shelter from the elements. Lines 16 may comprise, for example, cables, chains, wire rope, high performance polyethylene (HPPE) fibers such as Spectra™ or Dyneema™, sailing rigging, webbing or the like. In some embodiments, additional lines (not shown) may be sewn into the seams and/or walls of panel 12 to provide additional strength to panel 12.

Panel 12 may be constructed from a transparent material to allow sunlight to pass therethrough, as indicated by arrow 13. The lower wall 12L of panel 12 may be optionally covered with a reflective material to reflect light incident thereon from below back down towards the ground, as indicated by arrow 15. Alternatively, the upper wall 12U and/or lower wall 12L of panel 12 may be covered with a diffusing material such that sunlight instant on panel 12 from above is diffused in the area below panel 12, as indicated by arrows 17. In other embodiments, panel 12 may be constructed from, or covered with, an opaque material to block light from reaching the shooting location. Thus, a user may create a customized structure suitable for any of a variety of filming requirements by optionally covering panel 12 with appropriate materials.

Figure 1A:
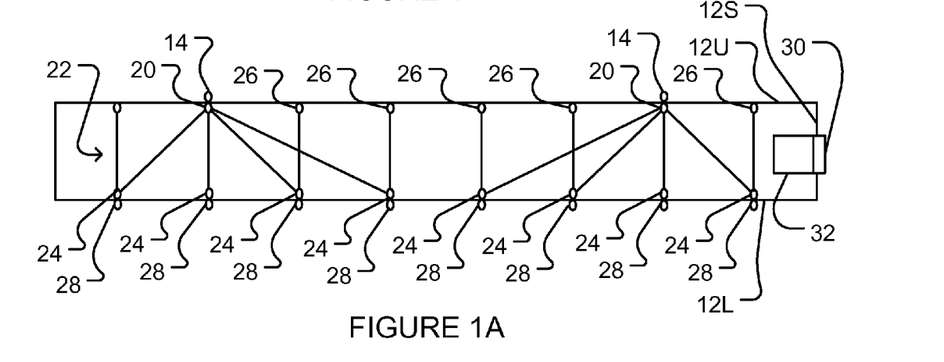
FIG. 1A is a sectional view taken along line A-A of FIG. 1.

As shown in FIG. 1A, upper exterior eyelets 14 are coupled to load bearing interior eyelets 20 on the inside of panel 12. In some embodiments, each upper exterior eyelet 14 and the corresponding load bearing interior eyelet 20 are constructed from a single piece of rigid material, or are constructed from separate pieces which have been fixedly attached together, to form a unitary member extending through upper wall 12U of panel 12. Interior connectors 22 extend between load bearing interior eyelets 20 and a plurality of lower interior eyelets 24. Connectors 22 may comprise, for example, cables, chains, wire rope, HPPE fibers such as Spectra™ or Dyneema™, sailing rigging, webbing or the like. Connectors 22 may also extend between lower interior eyelets 24 and upper interior eyelets 26. Connectors 22 help panel 12 to maintain its shape, and transfer loads from lower interior eyelets 24 to load bearing interior eyelets 20. Vertically oriented connectors 22 are useful in preventing ballooning of panel 12, and diagonally oriented connectors 22 spread forces out over a number of eyelets 20.

A plurality of lower exterior eyelets 28 are coupled to lower interior eyelets 24. In some embodiments, each lower interior eyelet 24 and the corresponding lower exterior eyelet 28 are constructed from a single piece of rigid material, or are constructed from separate pieces which have been fixedly attached together, to form a unitary member extending through lower wall 12L of panel 12. Lower exterior eyelets 28 may be used to support objects such as props, scenery elements, or the like. The weight of objects hung from lower exterior eyelets 28 is thus supported by upper exterior eyelets 14 through lower interior eyelets 24, interior connectors 22 and load bearing interior eyelets.

The eyelets of the illustrated embodiments facilitate the attachment of cables, straps or the like. As one skilled in the art will appreciate, the eyelets may be replaced with other structures which permit cables, straps or the like to be attached thereto.

An air inlet 30 is located on one of the outer walls of inflatable panel 12. An inflation apparatus 32 is coupled to air inlet 30 to draw air into the interior of inflatable panel 12 through air inlet 30. Air inlet 30 may comprise, for example, a snorkel apparatus to prevent water from being drawn into panel 12 during rainy weather.

Figure 2:
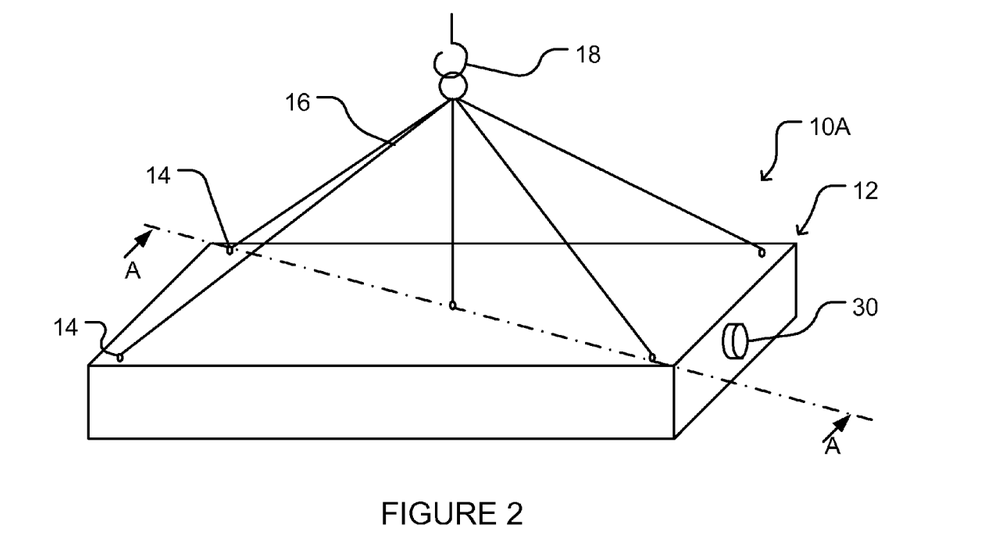
FIG. 2 shows a structure according to another embodiment.
Figure 2A:
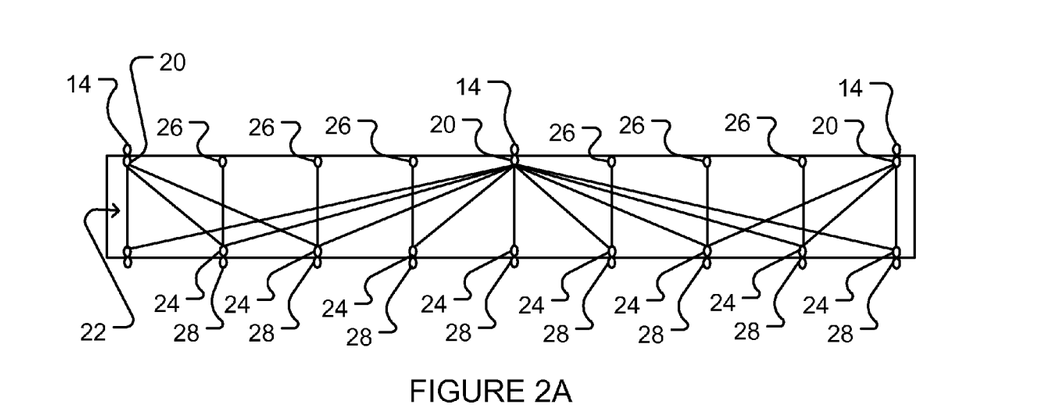
FIG. 2A is a sectional view taken along line A-A of FIG. 2.

FIGS. 2 and 2A show a structure 10A according to another embodiment. Structure 10A is similar to structure 10 of FIGS. 1 and 1A, and the reference numerals used in FIGS. 1 and 1A are used to identify analogous elements in FIGS. 2 and 2A. Structure 10A differs from structure 10 in that instead of having four upper exterior eyelets 14 engaged by four lines 16, structure 10A comprises five upper exterior eyelets 14 engaged by five lines 16, as shown in FIG. 2. In structure 10A, the additional upper exterior eyelet 14 may be positioned above the center of mass of panel 12, for example.

FIG. 2A shows an example arrangement of connectors 22 of structure 10A. In the FIG. 2A embodiment, connectors 22 are coupled between each load bearing interior eyelet 20 and a plurality of lower interior eyelets 24. Also, some lower interior eyelets 24 are coupled, by connectors 22, to two or more load bearing interior eyelets 20.

Figure 2B:
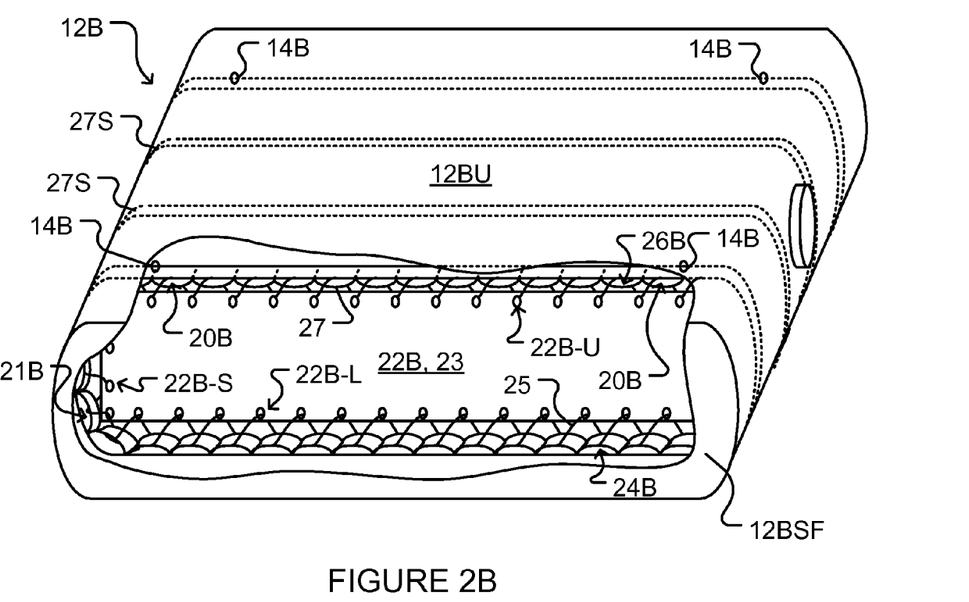
FIG. 2B shows a partial cutaway view of a structure according to another embodiment.

FIG. 2B shows a panel 12B according to another embodiment. In FIG. 2B, a portion of upper wall 12BU and front side wall 12BSF of panel 12B is cutaway to reveal the interior of panel 12B. Panel 12B is similar to panel 12 shown in FIGS. 1 and 1A, and the reference numerals used in FIGS. 1 and 1A are used to identify analogous elements in FIG. 2B. In FIG. 2B lower interior eyelets 24B and upper interior eyelets 26B comprise loops of webbing 27. Panel 12B also comprises optional sidewall interior eyelets 21B located on the inside of sidewalls of panel 12B, sidewall interior eyelets 21B also comprise loops of webbing 27. Upper exterior eyelets 14B are fixedly attached to webbing 27 that forms interior eyelets 21B, 24B and 26B. In some embodiments, upper exterior eyelets 14B may be formed by loops of webbing sewn to upper wall 12BU directly above webbing 27 on the interior of panel 12B. As a result, loads from upper exterior eyelets 14B are distributed along at least part of webbing 27, and thereby to at least some upper interior eyelets 26B. The upper interior eyelets 26B to which loads from upper exterior eyelets 14B are distributed accordingly comprise load bearing interior eyelets 20B.

Figure 2C:
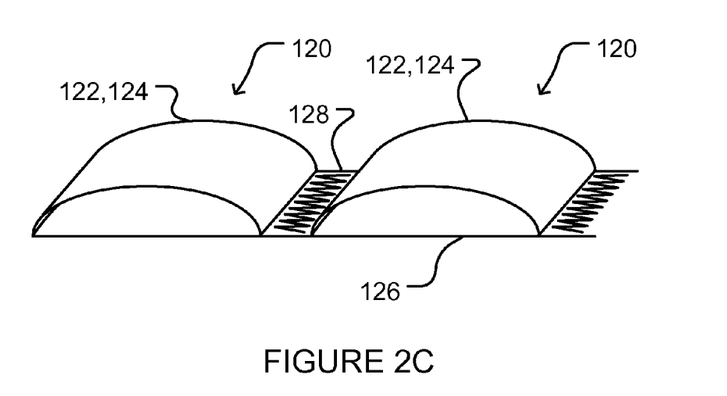
FIG. 2C shows an eyelet according to an example embodiment.

FIG. 2C shows a detail perspective view of two eyelets 120 comprising loops of webbing 122. Loops 122 comprise slack portions 124 of a strip of webbing joined to a base member 126 by cross-strip stitches 128 at spaced apart locations. Base member may comprise another strip of webbing, or may comprise one of the interior of walls of panel 12B, for example. As shown in FIG. 2B, lower interior eyelets 24B, upper interior eyelets 26B and sidewall interior eyelets 21B may be formed from a single continuous strip of webbing in some embodiments. In other embodiments, discrete strips of webbing may be used to form lower interior eyelets 24B, upper interior eyelets 26B and sidewall interior eyelets 21B. Webbing 122 may be secured to interior walls of panel 12B directly (e.g., by stitching) and/or indirectly (e.g., by attachment of a base member 126 that is distinct from the interior walls of panel 12B to the interior walls of panel 12B).

Also shown in FIG. 2B is a panel-type connector 22B. Panel-type connector 22B comprises a generally rectangular panel 23. Panel-type connector 22B connects upper interior eyelets 26B (along its top side), lower interior eyelets 24B (along its bottom side), and sidewall interior eyelets 21B (along its sides). More particularly, panel-type connector 22B comprises a plurality of upper eyelets 22B-U along the top edge of panel 23, a plurality of lower eyelets 22B-L along the bottom edge of panel 23, and a plurality of side eyelets 22B-S along the side edges of panel 23. Upper eyelets 22B-U are coupled to adjacent upper interior eyelets 26B, lower eyelets 22B-L are coupled to adjacent lower interior eyelets 24B, and side eyelets 22B-S are coupled to adjacent sidewall interior eyelets 21B. In the illustrated embodiment, the coupling between eyelets 22B-U, 22B-L and 22B-S of connector 22B and eyelets 24B, 26B and 21B comprises a cord 25 laced alternately between eyelets on the inside of panel 12B and eyelets on connector 22B. In some embodiments, cord 25 comprises an elastic cord; in other embodiments cord 25 is inelastic. It will be appreciated that couplings between eyelets 22B-U, 22B-L and 22B-S of connector 22B and eyelets 24B, 26B and 21B may comprise other components (e.g., rings, crimp connectors, etc.) instead of or in addition to cord 25 and/or may be effected directly (e.g., by adhesive or the like).

In FIG. 2B, stitching 27S that couples strips of webbing material from which eyelets 24B, 26B and 21B are formed to the interior of upper wall 12BU is visible on the outside walls of panel 12B. From stitching 27S, it is apparent that panel 12B comprises a plurality of strips of eyelet webbing (not all of which are visible in FIG. 2B). In panel 12B, each of these strips of eyelet webbing is coupled to a corresponding panel-type connector 22B, such that panel 12B comprises a plurality of generally parallel, spaced-apart panel-type connectors 22B.

Figure 3:
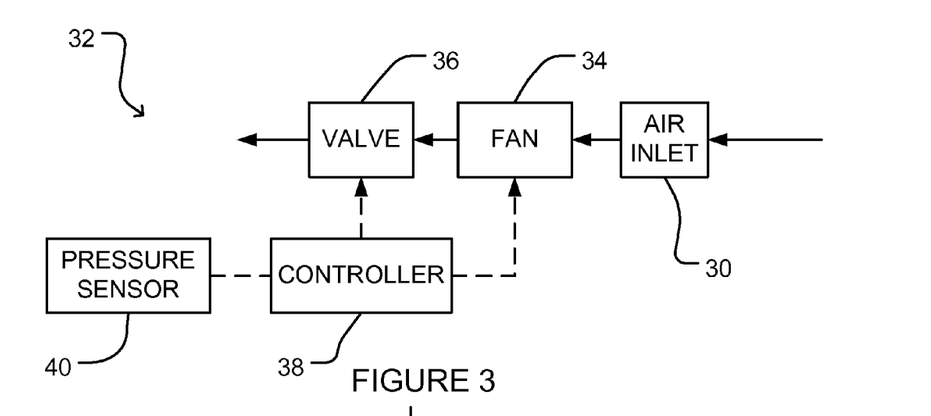
FIG. 3 schematically depicts an inflation apparatus according to one embodiment.

FIG. 3 schematically illustrates the components of inflation apparatus 32 according to an example embodiment. Inflation apparatus 32 comprises a fan 34 and a valve 36. Inflation apparatus 32 may also comprise a suitable power source (not shown). Fan 34 is configured to draw air from outside of inflatable panel 12 through air inlet 30 and direct the air to the interior of inflatable panel 12 through valve 36. Valve 36 may comprise, for example, a one-way valve which allows air to flow into panel 12 but prevents air from leaving panel 12. Alternatively, valve 36 may comprise a two-way valve which may be selectively opened and closed under control of a controller 38. In some embodiments, fan 34 is operated under the control of controller 38.

In such embodiments, controller 38 can selectively cause inflation apparatus 32 to inflate panel 12. In some embodiments, controller 38 may also selectively cause inflation apparatus 32 to deflate panel 12. A pressure sensor 40 may be coupled to controller 38 such that controller 38 causes inflation apparatus 32 to draw air into panel 12 if the pressure in panel 12 drops below a predetermined threshold. Controller 38 may also be in communication (wireless or otherwise) with a user interface (not shown) to allow a user to manually control the inflation and deflation of panel 12.

Figure 4:
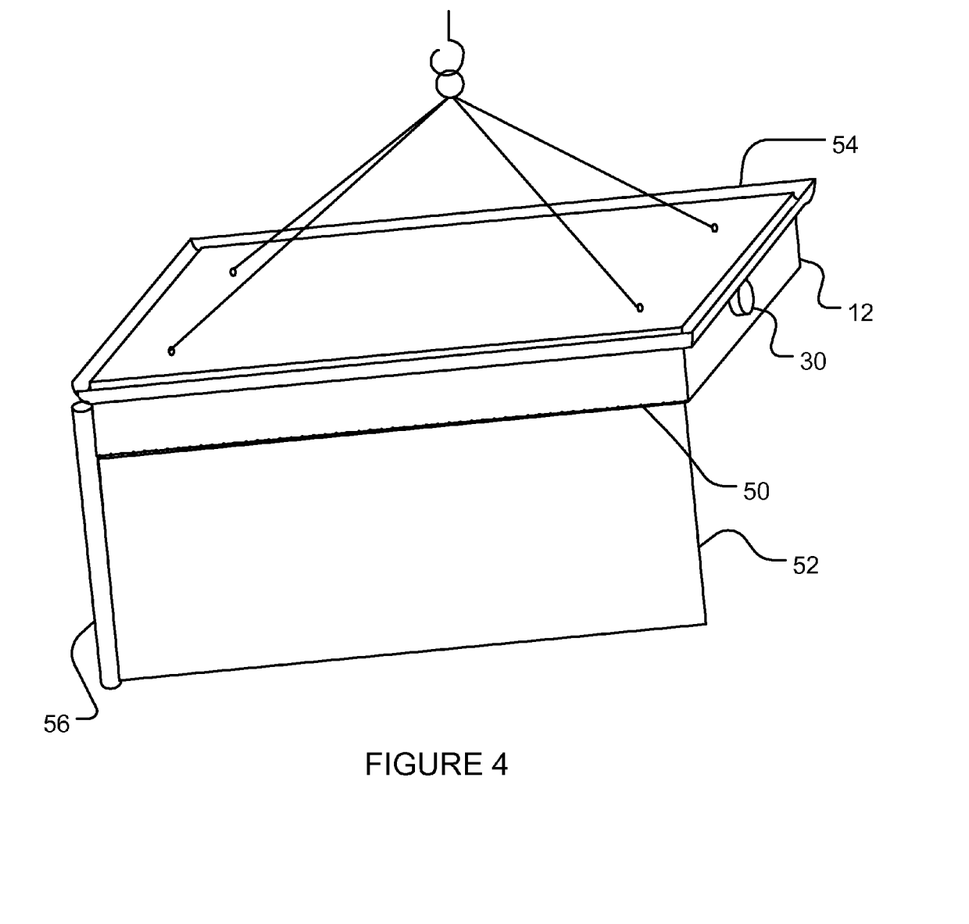
FIG. 4 shows a structure according to another embodiment.

As shown in FIG. 4, panel 12 may be suspended at an angle in certain situations, such as for example, in windy and rainy weather. Panel 12 may comprise a zipper 50 (or another attachment mechanism such as, for example, a series of snaps or ties) along all or a portion of a lower edge thereof. Alternatively, zippers, snaps ties or the like may be provided along the sides, top and/or bottom of panel 12, or along portions thereof. Zipper 50 permits a screen 52 to be hung from panel 12. Screen 52 may comprise, for example, a diffuser, a reflector, a background scene or a blue screen or green screen. Screen 52 may also provide additional shelter from wind driven rain. A gutter 54 and downpipe 56 may be provided in some embodiments to collect rainwater falling on panel 12.

Figure 5:
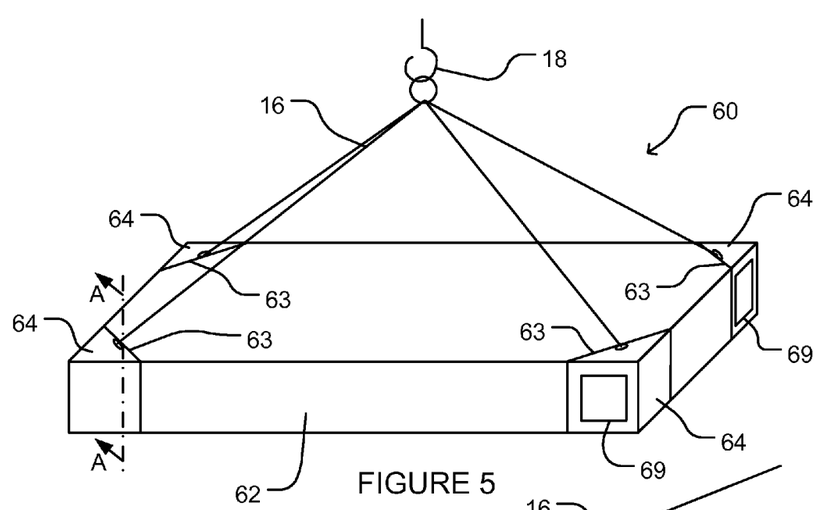
FIG. 5 shows a structure according to another embodiment.
Figure 5A:
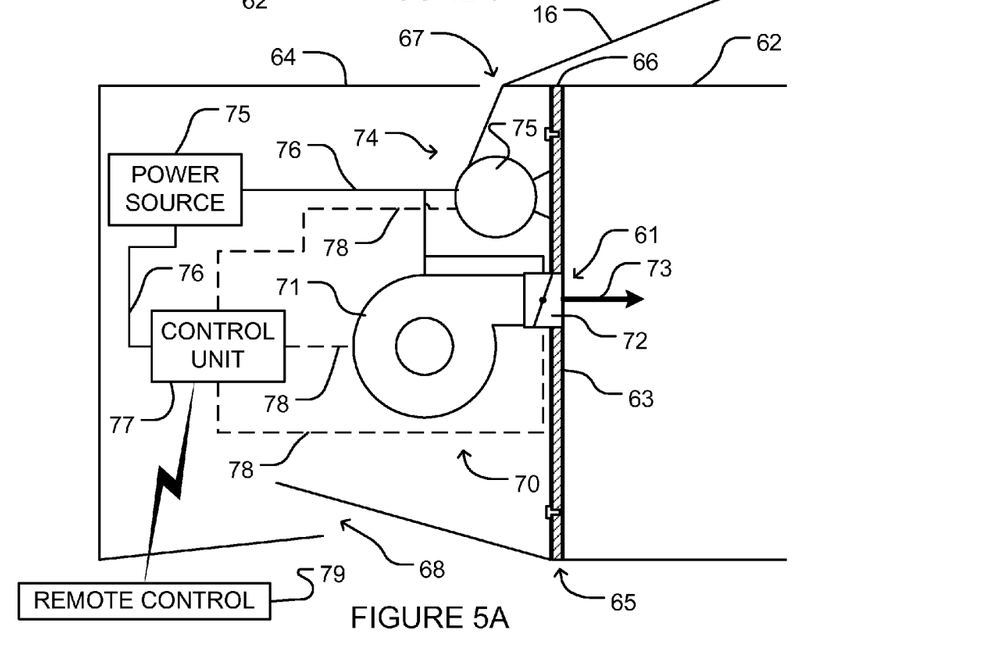
FIG. 5A is a sectional view taken along line A-A of FIG. 5.

FIGS. 5 and 5A show a structure 60 according to another embodiment. Structure 60 comprises an inflatable panel 62 with clipped or beveled corners 63. Panel 62 may comprise connectors and eyelets (not shown) in the interior thereof similar to the interior connectors and eyelets discussed above to provide structural integrity to panel 62.

A corner housing 64 is attached to each corner 63 of panel 62 by a coupling structure 65. Coupling structure 65 may comprise, for example, a rigid plate 66 affixed to corner 63 to which housing 64 may be bolted, as shown in the embodiment of FIG. 5A. In other embodiments, coupling structure 65 may comprise a tube frame (see FIG. 5C) provided at each corner 63 of panel 62, and housings 64 may be attached to the tube frames by pins or the like, so that housings 64 may be readily detached from panel 62 for maintenance, or when panel 62 is to be transported or stored. Interior connectors (not shown) of panel 62 may be coupled to coupling structure 65 (e.g., rigid plate 66, or the tube frame in some embodiments), or to one or more load bearing interior eyelets (not shown) coupled thereto, to support the weight of panel 62 and any objects hung from lower exterior eyelets (not shown) thereof.

Each corner housing 64 defines a line guide 67 on an upper surface thereof, and an air inlet 68 on either a lower or side surface thereof. Each housing 64 may also have an access 69 on one surface thereof to facilitate maintenance.

An inflation/deflation mechanism 70 is contained within each housing 64. In the illustrated embodiments, mechanism 70 comprises a fan 71 located to blow air through a valve 72. Valve 72 extends through the side of housing 64 and into the interior of panel 62 through an aperture 61 defined in corner 63 and plate 66. Aperture 61 may form a seal around valve 72, or a separate sealing device (not shown) may be provided. When activated, fan 71 draws air into housing 64 through inlet 68, and forces air into panel 62 as indicated by arrow 73.

A hoisting mechanism 74 is also contained within each housing 64. Hoisting mechanisms 74 serve as the attachment points for facilitating suspension of structure 60. In the illustrated embodiment, hoisting mechanism 74 comprises a winch 75 which is adapted to selectively wind up or release line 16 which extends through line guide 67 to adjust the height of housing 64.

Inflation/deflation mechanism 70 and hoisting mechanism 74 are supplied with power from a power source 75 through power lines 76. Power source 75 also supplies power to a control unit 77. Power source 75 may comprise, for example, an AC power source or a DC power source. Inflation/deflation mechanism 70 and hoisting mechanism 74 may be selectively activated under control of control unit 77 coupled thereto by control lines 78. A remote control 79 may be provided to allow a user to control the operation of inflation/deflation mechanism 70 and hoisting mechanism 74 from a remote location.

Figure 5B:
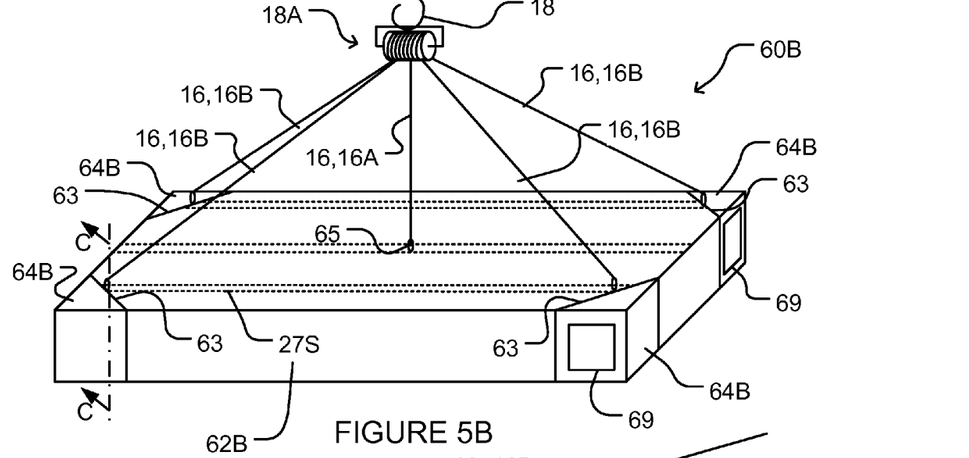
FIG. 5B shows a structure according to another embodiment.
Figure 5C:
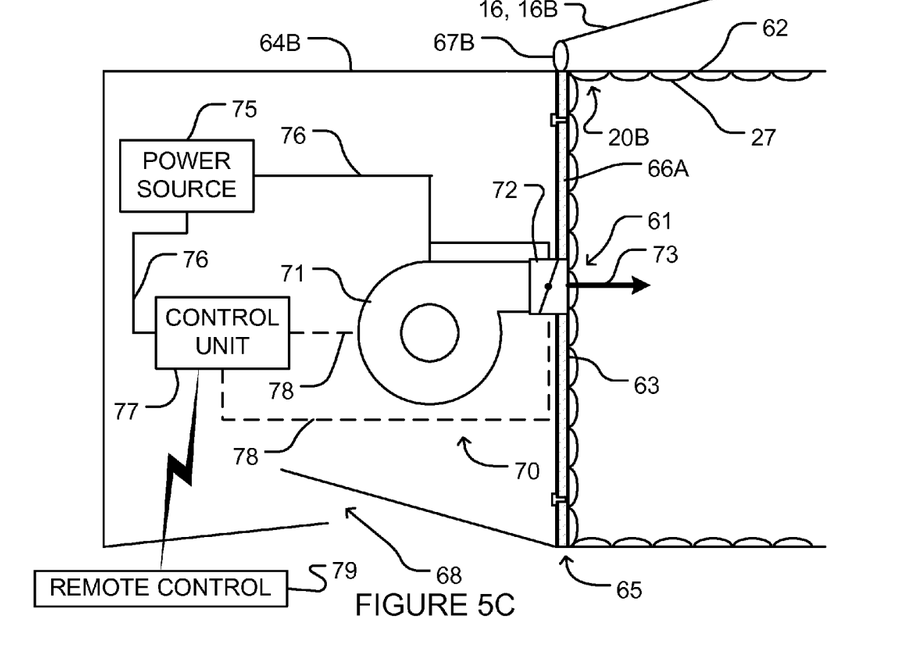
FIG. 5C is a sectional view taken along line C-C of FIG. 5B.

FIGS. 5B and 5C show a structure 60B according to another embodiment. Structure 60B is similar to structure 60 shown in FIGS. 5 and 5A, and the reference numerals used in FIGS. 5 and 5A are used to identify analogous elements in FIGS. 5B and 5C. Structure 60B differs from structure 60 in that corner housings 64B of structure 60B do not have winches. Instead, in structure 60B lines 16 comprise a center line 16A and four corner lines 16B, all of which are engaged in a hoisting mechanism, namely winch 18A, that is suspended from hook 18. Central line 16A is coupled to a central exterior eyelet 65. Corner lines 16B are anchored at corner housings 64B as described below with reference to FIG. 5C. Winch 18A is adapted to selectively wind up lines 16 to draw panel 62B toward hook 18, and to selectively release lines 16 to allow panel 62B to move away from hook 18 under force of gravity. In the illustrated embodiment, panel 62B is similar to panel 12B and comprises panel-type connectors (not shown) similar to those of FIG. 2B, as indicated by stitching 27S. In other embodiments, panel 62B may be similar to panel 12 shown in FIGS. 1 and 2, with connectors similar to those shown in FIGS. 1A and 2A.

As best seen in FIG. 5C, in the illustrated embodiment corner lines 16B are anchored to exterior eyelets 67B. Exterior eyelets 67B may be attached to tube frames 66A used for coupling corner housings 64B to corners 63 of panel 62B. Exterior eyelets 67B may thus be coupled to load bearing interior eyelets 20B by anchoring portions of webbing 27 to tube frames 66A. (A panel-type connector is not shown in FIG. 5C, but it is to be understood that a panel-type connector may be coupled to the eyelets formed by webbing 27 in substantially the same manner as described above with respect to FIG. 2B.) In some embodiments, lines 16B may be anchored to exterior eyelets at other locations, such as, for example, on the upper sides of corner housings 64B, or directly above panel-type connectors (not shown) within panel 62B.

Winch 18A or other hoisting mechanisms for drawing and releasing lines 16 may be adapted to draw and release central line 16A at a lower rate than corner lines 16B (e.g., to maintain panel 62B in a generally flat orientation). For example, winch 18A may comprise two winches, one configured to spool and unspool central line 16A at a first rate and the other configured to spool and unspool corner lines 16B at a second rate greater than the first rate. In some embodiments, winch 18A or another hoisting mechanism may be adapted to draw and release lines 16 at independently. For example, each one of lines 16 may be engaged in a separately controllable hoisting mechanism (e.g., one of five different winches). Independent control of the length of lines 16 between hook 18 and corner housings 64B or central exterior eyelet 65 may permit panel 62 to moved through a range of orientations. In some embodiments, the length of central line 16A is dependently controlled based on the lengths of corner lines 16B (e.g., to maintain tension on central line 16A for the lengths of corner lines 16B).

Figure 6:
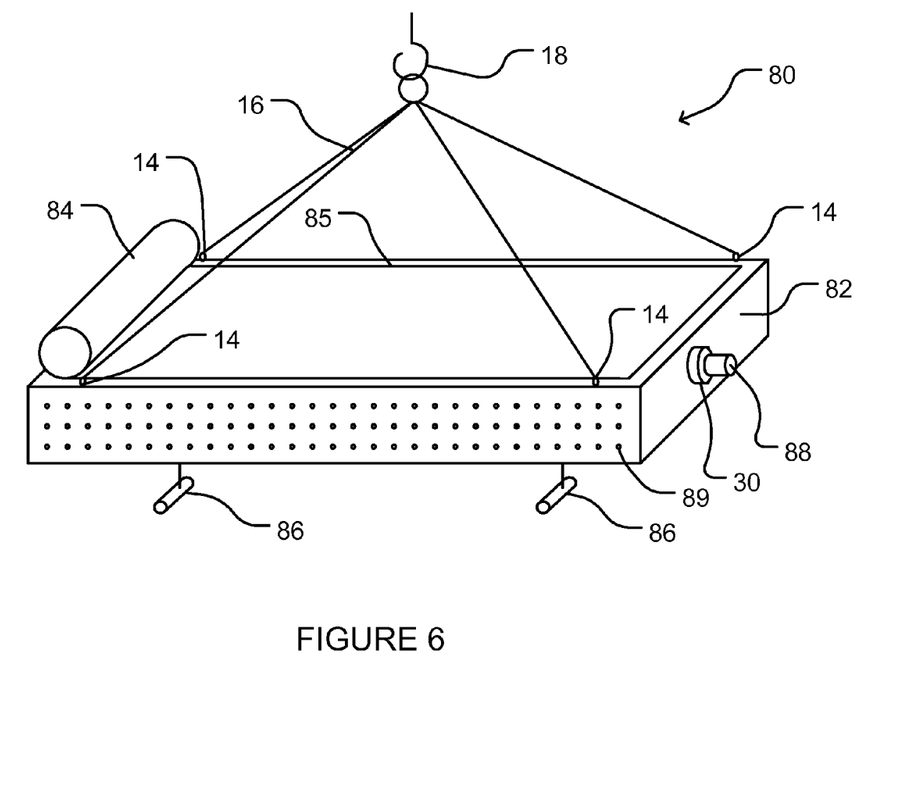
FIG. 6 shows a structure according to another embodiment.

FIG. 6 shows a structure 80 according to another embodiment. Structure 80 comprises an inflatable panel 82 similar to panel 12 of FIGS. 1 and 1A, expect that upper exterior eyelets 14 are located around a periphery of panel 82 in order to accommodate a furling device 84. In the illustrated embodiment, furling device 84 is attached to the top of panel 82, and a plurality of lights 86 are attached to the bottom of panel 82. In other embodiments, lights may be attached to the top of panel 82 and a furling device may be attached to the bottom of panel 82, lights and furling devices may be optionally attached to both the top and bottom of panel 82 (with the lights attached around the periphery thereof), or other permutations of lights and furling devices may be employed, depending on the desired lighting conditions to be achieved by structure 80.

In the illustrated embodiment, furling device 84 facilitates the covering and uncovering of the upper side of panel 82 with a sheet 85 of material with light-altering properties. Furling device 84 may optionally store a plurality of sheets of material for different desired lighting conditions. For example, in some embodiments furling device 84 may accommodate up to ten different sheets of material.

A cannister 88 may optionally be provided at the intake of air inlet 30 to selectively fill panel 82 with a gas or smoke having light-altering properties. LEDs 89 may be located in the walls or the interior of panel 82 to provide further lighting options for a user of structure 80.

Panels 12, 62 and 82 may have dimensions suitable for the intended application. For example, panels may be as small as 10' by 20' in some embodiments, and may be as large as 80' by 80'. Advantages which panels according to some embodiments of the invention have over the prior art include:

panels according to some embodiments of the invention have less weight than prior art structures, thereby allowing panels to be suspended from smaller, less expensive cranes;

panels according to some embodiments of the invention may be inflated relatively quickly, and are generally self-supporting once inflated, thereby reducing setup time;

panels according to some embodiments of the invention may be deflated and folded up to facilitate transportation and storage;

panels according to some embodiments of the invention are versatile and may be used in a variety of applications; and panels according to some embodiments of the invention may be supported on posts instead of hung from cranes, or may be held in a vertical orientation and supported on one of their edges to provide backdrops.

Figure 7:
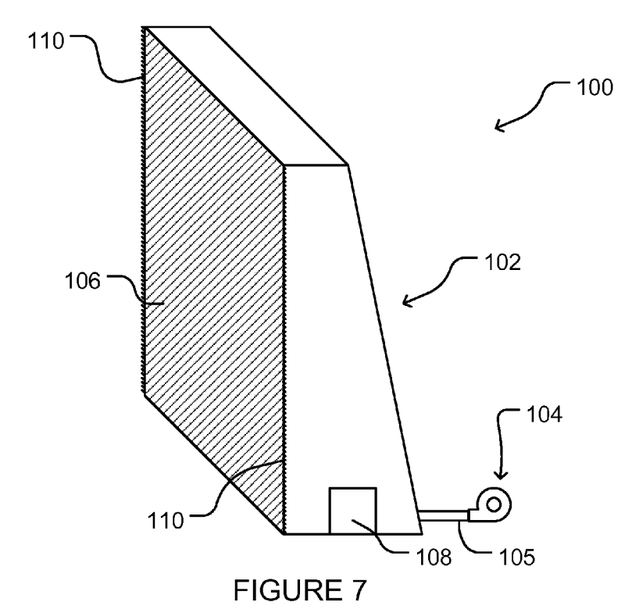
FIG. 7 shows a structure according to another embodiment.

FIG. 7 shows a structure 100 according to another embodiment. Structure 100 comprises an inflatable wall section 102 operatively coupled to an inflation apparatus 104 by a duct 105. Wall section 102 may comprise connectors and eyelets (not shown) in the interior thereof similar to the interior connectors and eyelets discussed above to provide structural integrity to wall section 102.

Wall section 102 has a generally vertically-oriented front face 106, which may comprise a green screen or blue screen for facilitating the shooting of footage for special effects. Wall section 102 has a generally tapered shape, with the base substantially wider than the top, to impart stability to wall section 102. An access port 108 may be provided in the lower portion of one of the sides of wall section 102 for allowing ballast to be inserted into and removed from the interior of wall section 102.

Figure 8:
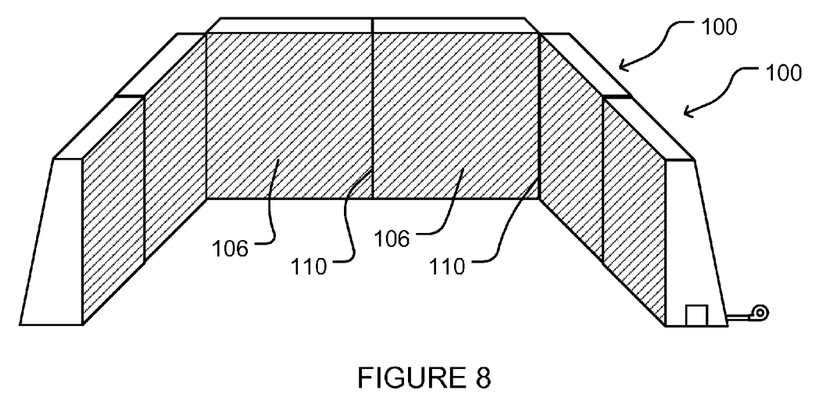
FIG. 8 shows a plurality of the structures of FIG. 7 joined together.

Wall section 102 may comprise zippers 110 (or other attachment mechanisms such as, for example, snaps or ties) along the sides of front face 106. Zippers 110 facilitate joining multiple structures 100 together, as shown for example in FIG. 8.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An apparatus for suspending over a shooting location, the apparatus comprising:
   an inflatable panel having walls constructed from a flexible airtight material enclosing an interior of the panel;
   at least one air inlet located in one of the walls of the panel;
   an inflation apparatus coupled to the air inlet and configured to direct air into the interior of the panel;
   a plurality of attachment points for facilitating suspension of the apparatus, each attachment point coupled to at least one corresponding load bearing interior eyelet located in the interior of the panel;
   a plurality of upper interior eyelets located in the interior of the panel on a lower side of an upper wall of the panel;
   a plurality of lower interior eyelets located in the interior of the panel on an upper side of a lower wall of the panel;
   at least one interior connector extending between the load bearing interior eyelets, the lower interior eyelets and the upper interior eyelets; and,
   a plurality of lower exterior eyelets located on a lower side of the lower wall of the panel, each lower exterior eyelet coupled to a corresponding lower interior eyelet.

2. An apparatus according to claim 1 wherein the upper interior eyelets and load bearing interior eyelets are formed from loops of webbing secured to an interior side of an upper wall of the panel.

3. An apparatus according to claim 2 wherein the attachment points comprise upper exterior eyelets located on an upper side of the upper wall of the panel and coupled to the webbing.

4. An apparatus according to claim 3 wherein the lower interior eyelets are formed from loops of webbing secured to an interior side of the lower wall of the panel.

5. An apparatus according to claim 4 wherein the webbing from which the load bearing interior eyelets, upper interior eyelets and lower interior eyelets are formed comprises a continuous webbing strip.

6. An apparatus according to claim 5 wherein the continuous strip forms a loop against the interior walls of the panel.

7. An apparatus according to claim 4 wherein the webbing comprises a plurality of webbing strips, and wherein at least one load bearing interior eyelet, upper interior eyelet and lower interior eyelet are formed on each webbing strip.

8. An apparatus according to claim 7 wherein the webbing strips are parallel and spaced apart.

9. An apparatus according to claim 8 wherein the at least one connector comprises a plurality of panel-type connectors, each panel-type connector extending between eyelets formed from a corresponding one of the plurality of webbing strips.

10. An apparatus according to claim 4 comprising a plurality of sidewall interior eyelets formed from loops of webbing located in the interior of the panel on an interior side of a sidewall of the panel, and wherein the at least one interior connector extends between the load bearing interior eyelets, the lower interior eyelets, the upper interior eyelets and the sidewall interior eyelets.

11. An apparatus according to claim 9 wherein the lower interior eyelets are formed from loops of webbing secured to an interior side of the sidewall of the panel.

12. An apparatus according to claim 10 wherein the webbing from which the load bearing interior eyelets, upper interior eyelets, lower interior eyelets and sidewall interior eyelets are formed comprises a continuous webbing strip.

13. An apparatus according to claim 12 wherein the continuous webbing strip forms a loop against the interior walls of the panel.

14. An apparatus according to claim 10 wherein the webbing comprises a plurality of webbing strips, and wherein at least one load bearing interior eyelet, upper interior eyelet, lower interior eyelet, and sidewall interior eyelet are formed on each webbing strip.

15. An apparatus according to claim 14 wherein the webbing strips are parallel and spaced apart.

16. An apparatus according to claim 15 wherein the at least one connector comprises a plurality of panel-type connectors, each panel-type connector extending between eyelets formed from a corresponding one of the plurality of webbing strips.

17. An apparatus for suspending over a shooting location, the apparatus comprising:

an inflatable panel having walls constructed from a flexible airtight material enclosing an interior of the panel;
an air inlet located in one of the walls of the panel;
an inflation apparatus located in the interior of the panel and coupled to the air inlet for drawing air into the interior of the panel;
a plurality of upper exterior eyelets located on an upper side of an upper wall of the panel, each of the upper exterior eyelets fixedly attached to at least one corresponding load bearing interior eyelet located in the interior of the panel on a lower side of the upper wall of the panel;
a plurality of lower interior eyelets located in the interior of the panel on an upper side of a lower wall of the panel;
at least one interior connector extending between the load bearing interior eyelets and the lower interior eyelets; and,
a plurality of lower exterior eyelets located on a lower side of the lower wall of the panel, each lower exterior eyelet fixedly attached to a corresponding lower interior eyelet.

18. An apparatus according to claim 17 wherein the load bearing interior eyelets are formed from loops of webbing secured to an interior side of an upper wall of the panel.

19. An apparatus according to claim 18 wherein the upper exterior eyelets are fixedly attached to the webbing.

20. An apparatus according to claim 19 wherein the at least one interior connector comprises at least one panel-type connector.

21. An apparatus according to claim 20 wherein each lower interior eyelet is positioned approximately directly below a corresponding one of the load bearing interior eyelets and wherein one of the at least one panel-type connectors extends between each lower interior eyelet and the corresponding load bearing interior eyelet.

* * * * *